US010994990B1

(12) United States Patent
Rao et al.

(10) Patent No.: US 10,994,990 B1
(45) Date of Patent: May 4, 2021

(54) INLINE SPECTROSCOPY FOR MONITORING CHEMICAL VAPOR DEPOSITION PROCESSES

(71) Applicant: Government of the United States, as represented by the Secretary of the Air Force, Wright-Patterson AFB, OH (US)

(72) Inventors: Rahul S. Rao, Yellow Springs, OH (US); Benji Maruyama, Yellow Springs, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 67 days.

(21) Appl. No.: 16/594,114

(22) Filed: Oct. 7, 2019

Related U.S. Application Data

(60) Provisional application No. 62/760,116, filed on Nov. 13, 2018.

(51) Int. Cl.
| | |
|---|---|
| *B82B 3/00* | (2006.01) |
| *G01J 3/44* | (2006.01) |
| *G01N 21/65* | (2006.01) |
| *G01J 3/10* | (2006.01) |
| *B82Y 30/00* | (2011.01) |
| *B82Y 40/00* | (2011.01) |

(52) U.S. Cl.
CPC .............. *B82B 3/0004* (2013.01); *G01J 3/10* (2013.01); *G01J 3/44* (2013.01); *G01N 21/65* (2013.01); *B82Y 30/00* (2013.01); *B82Y 40/00* (2013.01)

(58) Field of Classification Search
CPC .................................................... B82B 3/0004
USPC ........................................................... 356/301
See application file for complete search history.

(56) References Cited

U.S. PATENT DOCUMENTS

| | | | |
|---|---|---|---|
| 7,245,371 | B2 | 7/2007 | Wang et al. |
| 7,315,374 | B2 | 1/2008 | Tan et al. |
| 7,480,054 | B2 | 1/2009 | Treado et al. |

(Continued)

FOREIGN PATENT DOCUMENTS

| | | |
|---|---|---|
| EP | 2982967 A1 | 2/2016 |
| EP | 2219995 B1 | 8/2017 |

(Continued)

*Primary Examiner* — Tarifur R Chowdhury
*Assistant Examiner* — Omar H Nixon
(74) *Attorney, Agent, or Firm* — AFMCLO/JAZ; Timothy Barlow

(57) ABSTRACT

A method for making nanomaterials includes introducing into a catalyzed reactor vessel: a carrier gas at a first carrier gas feed rate; at least one carbon-based reactant at a first reactant feed rate; and optionally, at least one additive at a first additive feed rate. The reactor vessel is heated to a first temperature of at least 150° C., so that a portion of the carbon-based reactant within the reactor vessel reacts to form a plurality of nanomaterials. An exhaust gas is removed from the reactor and periodically sampled by exposing a paper web to the gas so that a sample of the nanomaterials from the gas are deposited on a region of the paper web for analysis. Based on this analysis, at least one reaction parameter selected from the group consisting of the first carrier gas feed rate, the first reactant feed rate, and first temperature may be adjusted.

14 Claims, 4 Drawing Sheets

(56) References Cited

U.S. PATENT DOCUMENTS

| | | |
|---|---|---|
| 8,060,943 B1 | 11/2011 | Popescu et al. |
| 8,734,536 B2 | 5/2014 | Beck et al. |
| 2002/0172767 A1 | 11/2002 | Grigorian et al. |
| 2004/0106234 A1 | 6/2004 | Sorg et al. |
| 2007/0160522 A1 | 7/2007 | Ryu et al. |
| 2007/0253890 A1* | 11/2007 | Nakayama ............... C01B 32/05 423/447.3 |
| 2008/0199389 A1* | 8/2008 | Chiu .................... C01B 32/162 423/447.3 |
| 2010/0247419 A1* | 9/2010 | Nguyen ................. B82Y 30/00 423/447.2 |
| 2012/0171682 A1 | 7/2012 | Marchand et al. |
| 2012/0178640 A1 | 7/2012 | Strano et al. |
| 2012/0321544 A1* | 12/2012 | Takai ................... B01J 37/0217 423/447.3 |
| 2013/0295000 A1* | 11/2013 | Dickinson .............. B82Y 40/00 423/448 |
| 2016/0236936 A1* | 8/2016 | Koziol ................... C30B 25/00 |
| 2016/0268014 A1 | 9/2016 | Heintz et al. |
| 2018/0170758 A1* | 6/2018 | Hirai ..................... B82Y 40/00 |

FOREIGN PATENT DOCUMENTS

| | | | |
|---|---|---|---|
| EP | 3053877 B1 | 9/2018 | |
| WO | 2003072859 A1 | 9/2003 | |
| WO | 2012082135 A1 | 6/2012 | |
| WO | WO-2017010523 A1 * | 1/2017 | ........... C01B 32/162 |

* cited by examiner

US 10,994,990 B1

INLINE SPECTROSCOPY FOR MONITORING CHEMICAL VAPOR DEPOSITION PROCESSES

Pursuant to 37 C.F.R. § 1.78(a)(4), this application claims the benefit of and priority to prior filed Provisional Application Ser. No. 62/760,116, filed 13 Nov. 2018, which is expressly incorporated herein by reference.

GOVERNMENT INTEREST

The invention described herein may be manufactured, used, and licensed by or for the Government of the United States for all governmental purposes without the payment of any royalty.

FIELD OF THE INVENTION

The present disclosure relates to the field of nanomaterials, and more specifically to a method for monitoring the making of nanomaterials by chemical vapor deposition.

BACKGROUND OF THE INVENTION

Nanomaterials such as carbon nanotubes are an emerging area of both commercial and research interest. One common method for producing nanomaterials is through a chemical vapor deposition (CVD) reaction process. Until now, however, it has been difficult to reliably control the structure and quality of the nanotubes or other nanomaterials produced by the CVD process (diameter, single vs multi-wall, metallic vs. semi-conducting, etc.). Moreover, by the time defects in the nanomaterials are discovered, the CVD reaction process is complete and it is too late to lessen or eliminate the defects in the batch of nanomaterials produced.

It would therefore be desirable to provide a method for assessing the properties of carbon nanotubes or other nanomaterials while the CVD reaction is still ongoing. It would further be desirable to provide inline (i.e., real time) feedback control of the CVD reaction based upon the properties of the nanomaterials being produced.

SUMMARY OF THE INVENTION

In response to these issues, the present disclosure provides, in a first aspect, a method for making nanomaterials, such as carbon nanotubes. In accordance with one embodiment of the present disclosure, this method includes an initial step of providing a reactor vessel for reacting one or more gas phase reactants. The reactor vessel includes an inlet port, an outlet port, a reaction catalyst disposed within the reactor vessel, and at least one heating element disposed adjacent to the reactor vessel. The method includes a step of introducing into the reactor inlet port: (1) a carrier gas at a first carrier gas feed rate; (2) at least one carbon-based reactant at a first reactant feed rate; and (3) optionally, at least one additive at a first additive feed rate. At least a first zone of the reactor vessel is heated to a first temperature of at least 150° C., using the at least one heating element, so that a portion of the carbon-based reactant within the reactor vessel reacts to form a plurality of nanomaterials. The method may also include a step of removing exhaust gas—which includes carrier gas, reactant, catalyst, and nanomaterials—from the reactor. In addition, the method may also include a step of periodically sampling the exhaust gas by exposing a paper web to the exhaust gas so that a sample of the nanomaterials from the exhaust gas are deposited on a region of the paper web. The nanomaterials deposited on the paper web may then be analyzed.

In certain embodiments of the method, the nanomaterials are spectroscopically analyzed while the reaction within the reactor vessel continues, and the method also includes a further step of adjusting, based on the spectroscopic analysis of the nanomaterials, at least one reaction parameter selected from the group consisting of the first carrier gas feed rate, the first reactant feed rate, and the first temperature.

In some embodiments of the method, the reaction catalyst includes a transition metal. In certain embodiments, this transition metal is selected from the group consisting of iron, cobalt, nickel, molybdenum, ruthenium, rhodium, gallium, indium, copper, gold, silver, platinum, palladium, tungsten, and mixtures thereof.

According to certain embodiments of the method, the nanomaterials are made up of carbon nanotubes and the reaction catalyst includes at least one organometallic compound which in turn includes a transition metal.

In certain embodiments of the method, the at least one carbon-based reactant is made up of at least one gas selected from the group consisting of ethanol, methanol, isopropanol and butanol, xylene, toluene, benzene, hexane, cyclohexane, methane, ethylene, acetylene, ethane, propane, and propylene.

In some embodiments of the method, the carrier gas is made up of at least one gas selected from the group consisting of nitrogen, helium, neon, and argon.

In certain embodiments of the method, the at least one additive introduced into the reactor is selected from the group consisting of water, ammonia, carbon dioxide, carbon monoxide, thiophene, dimethyl sulfoxide, carbon tetrafluoride, sulfur hexafluoride, acetonitrile, and carborane.

According to certain embodiments of the method, the first temperature is from about 350° C. to about 1200° C.

In certain embodiments of the method, the paper web is made up of an elongate strip of paper, such as a cellulose filter paper, and a plurality of nanomaterials samples from the exhaust gas are deposited on different regions of the paper web. Further, in some instances, a time stamp is recorded on the paper web for each of the nanomaterials samples deposited on the paper web.

According to certain embodiments of the method, at least 80 weight percent of the nanomaterials formed in the reactor vessel are single wall carbon nanotubes.

In certain embodiments of the method, the nanomaterials are analyzed using Raman spectroscopy.

In a second aspect, the present disclosure provides a reactor system for making nanomaterials. In accordance with one embodiment of the present disclosure, this reactor system includes a reactor vessel for reacting one or more gas phase reactants. This reactor vessel includes an inlet port, an outlet port, a reaction catalyst disposed within the reactor vessel, and at least one heating element disposed adjacent to the reactor vessel. The reactor system also includes: (1) a supply of carrier gas in flow communication with the reactor inlet port and a carrier gas control valve for varying the supply of carrier gas; (2) a supply of at least one carbon-based reactant in flow communication with the reactor inlet port and a carbon-based reactant control valve for varying the supply of carbon-based reactant; and (3) a supply of a paper web disposed adjacent the reactor outlet port for periodically sampling an exhaust gas from the reactor by exposing a paper web to the exhaust gas, so that a sample of nanomaterials from the exhaust gas are deposited on a region of the paper web. Further, the reactor system also includes a spectroscopic probe disposed adjacent the paper web for spectroscopically analyzing the nanomaterials deposited on the paper web; and a controller for receiving spectroscopic information from the spectroscopic probe. Based on this spectroscopic information, the controller adjusts at least one of: (1) the carrier gas control valve; (2) the reactant control valve; and (3) the at least one heating element.

According to some, the reaction catalyst includes a transition metal. In certain embodiments, this transition metal is selected from the group consisting of iron, cobalt, nickel, molybdenum, ruthenium, rhodium, gallium, indium, copper, gold, silver, platinum, palladium, tungsten, and mixtures thereof.

In some embodiments, the nanomaterials are made up of carbon nanotubes and the reaction catalyst includes at least one organometallic compound which in turn includes a transition metal.

In certain embodiments, the at least one carbon-based reactant is made up of at least one gas selected from the group consisting of ethanol, methanol, isopropanol and butanol, xylene, toluene, benzene, hexane, cyclohexane, methane, ethylene, acetylene, ethane, propane, and propylene.

In some instances, the carrier gas is made up of at least one gas selected from the group consisting of nitrogen, helium, neon, and argon.

In certain embodiments, the paper web is made up of an elongate strip of paper and a plurality of nanomaterials samples from the exhaust gas are deposited on different regions of the paper web. Further, in some instances, a time stamp is recorded on the paper web for each of the nanomaterials samples deposited on the paper web.

In some embodiments, the spectroscopic probe is a Raman spectroscopic probe.

In a further aspect, the present disclosure provides a carbon nanotube sampling log. According to one embodiment, this sampling log includes an elongate strip of a paper web and a plurality of nanomaterials samples deposited on different regions of the paper web. According to certain embodiments, a time stamp is recorded on the paper web for each of the nanomaterials samples deposited on the paper web.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

In one aspect, the present disclosure provides a method for making nanomaterials. Most commonly the nanomaterials will be carbon nanotubes, but in other instances, the method of the present disclosure may be used to produce other nanomaterials, such as various carbon fullerenes or nanotubes made from non-carbon materials, such as boron nitride. For simplicity, the method of the present disclosure is generally discussed below with respect to the preparation of carbon nanotubes, while those of ordinary skill will appreciate that the method of the present disclosure may also be utilized for the making of other nanomaterial forms.

In general, the method of the present disclosure includes providing a reactor vessel for reacting one or more gas phase reactants. The reactants are introduced into the reactor vessel and heated to a first temperature of at least 150° C., so that a portion of the carbon-based reactant within the reactor vessel reacts to form a plurality of nanomaterials. Exhaust gas is removed from the reactor vessel and periodically by exposing a paper web to the exhaust gas so that a sample of the nanomaterials from the exhaust gas are deposited on a region of the paper web. The nanomaterials deposited then analyzed.

Figure 1:
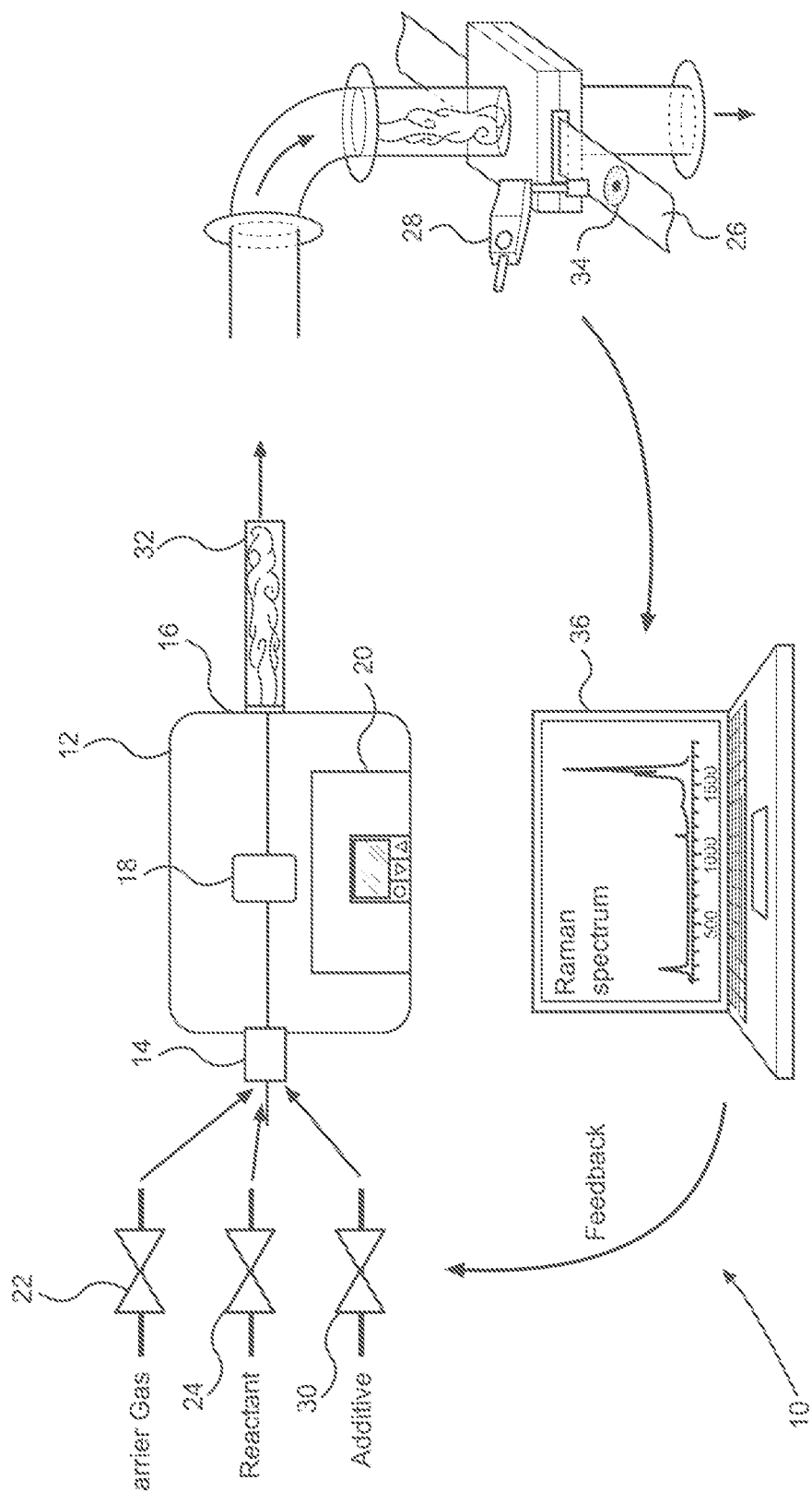
FIG. 1. is a schematic diagram of a reactor systems for use in nanomaterials according to one embodiment of the present disclosure.

The present disclosure also provides a reactor system for making nanomaterials. As illustrated in FIG. 1, this system 10 includes a reactor vessel 12 for reacting one or more gas phase reactants. The reactor vessel 12 includes an inlet port 14 and an outlet port 16. A reaction catalyst 18, typically includes a transition metal such as iron, cobalt, nickel, molybdenum, ruthenium, rhodium, gallium, indium, copper, gold, silver, platinum, palladium, tungsten, or a mixture thereof is disposed within the reactor vessel 12. For the making of carbon nanotubes, the reaction catalyst 18 generally includes at least one organometallic compound which in turn includes a transition metal.

At least one heating element 20 is also provided for heating of at least a first zone of the reactor vessel 12 and the materials contained therein. In some instances, a plurality of heating elements may be provided for independently heating a plurality of temperature zones within the reactor vessel 12. The heating element(s) 20 are generally disposed adjacent to the reactor vessel 12. The heating elements 20 are generally electrical heating elements, and the electrical power supplied to the heating elements 20 may be varied so as to provide control over the temperature within the reactor vessel 12.

The reactor vessel 12 is generally fabricated from a material which is heat resistant and generally inert. Typically, the reactor vessel 12 is fabricated from glass. The internal volume of the reactor vessel 12 is generally from about 0.1 to about 3 liters.

The reactor system 10 also includes supplies for the reactants and other materials which are to be fed into the reactor vessel 12. Thus, the reactor system 10 includes at least: (1) a supply of carrier gas in flow communication with the reactor inlet port 14 and a carrier gas control valve 22 for varying the supply of carrier gas; and (2) a supply of at least one reactant in flow communication with the reactor inlet port 14 and a reactant control valve 24 for varying the supply of carbon-based reactant.

Further, the reactor system 10 includes a supply of a paper web 26 disposed adjacent the reactor outlet port 16 for periodically sampling an exhaust gas from the reactor by exposing a paper web 26 to the exhaust gas, so that a sample of nanomaterials from the exhaust gas are deposited on a region of the paper web 26. Further, the reactor system 10 also includes a spectroscopic probe 28 disposed adjacent the paper web 26 for spectroscopically analyzing the nanomaterials deposited on the paper web 26.

According to the aforementioned method, the carrier gas, at least one reactant, and optionally, at least one additive are each introduced, from their respective supply sources, into the reactor vessel 12 view via the reactor inlet port 14.

Suitable carrier gases which may be introduced into the reactor vessel 12 include nitrogen, helium, neon, argon, and mixtures thereof. The carrier gas is introduced into the reactor vessel 12 at a carrier gas feed rate, which may be varied using the carrier gas control valve 22. Generally, the carrier gas feed rate may range from about 100 to about 5000 standard cubic centimeters per minute (SCCM).

When the method of the present disclosure is used to prepare carbon nanotubes, the at least one reactant will include at least one carbon-based reactant. Suitable carbon-based reactants include gases selected from the group consisting of ethanol, methanol, isopropanol and butanol, xylene, toluene, benzene, hexane, cyclohexane, methane, ethylene, acetylene, ethane, propane, propylene, and mixtures thereof. The at least one reactant is introduced into the reactor vessel 12 at a reactant feed rate, which may be varied using the reactant control valve 24. Generally, the reactant gas feed rate may range from about 1 milliliter per hour to about 1 milliliter per minute As noted above, in some instances, at least one additive may also be introduced into the reactor vessel 12. Examples of suitable additives may be selected from the group consisting of water, ammonia, carbon dioxide, carbon monoxide, thiophene, dimethyl sulfoxide, carbon tetrafluoride, sulfur hexafluoride, acetonitrile, carborane, and mixtures thereof. The at least one additive is introduced into the reactor vessel 12 at an additive feed rate, which may be varied using an additive control valve 30. Generally, the additive feed rate may range from about 100 to about 5000 standard cubic centimeters per minute (SCCM).

After being introduced into the reactor vessel 12, the aforementioned materials are heated, within at least a first zone of the reactor vessel 12, to a first temperature of at least 150° C. In some instances, the first temperature is from about 350° C. to about 1200° C. In some instances, the reactor vessel 12 may include multiple heating zones with separate heating elements 20, so that the differing heating zones may have different temperatures within the reactor vessel 12. Thus, for instance, a first zone of the reactor vessel 12 may be heated to a temperature of about 150° C., while a second zone of the reactor vessel 12 may be heated to a substantially higher temperature.

At these temperature(s), at least a portion of the reactant within the reactor vessel 12 reacts to form a plurality of nanomaterials 32. Thus, one of the aforementioned carbon-based reactants may react to form a plurality of carbon nanotubes.

In certain embodiments of the present disclosure, at least 80 weight percent of the nanomaterials formed in the reactor vessel 12 are single wall carbon nanotubes.

The typical residence time of the materials within the reactor vessel 12 is generally from about 10 to about 120 seconds. An exhaust gas is then removed from the reactor vessel 12 via the outlet port 16. This exhaust gas includes carrier gas, unused reactant, catalyst 18 and well as the carbon nanotubes or other nanomaterials 32 formed by the reaction.

As the exhaust gas is removed from the reactor vessel 12, a paper web 26 is periodically exposed to the exhaust gas, so that a sample 34 of the nanomaterials 32 from the exhaust gas is deposited on a region of the paper web 26. For instance, an elongated strip of paper web 26 on a spool or reel, such as a filter paper, may be positioned adjacent to the reactor vessel 12 outlet port 16, but away from the normal, direct flow path of the exhaust gas. A valve or other diverter may then be used to periodically redirect the flow of exhaust gas directly onto the paper web 26 in order to collect a sample 34 of particulates from the exhaust gas on paper web 26.

Again, this sampling of the exhaust gas may be carried out on a periodic basis. The gases may for instance be sampled once every 10 seconds to 3 minutes. In some instances, the reel of paper web 26 may be automatically advanced so that a plurality of nanomaterial samples 34 from the exhaust gas are deposited on different regions of the paper web 26. Further, in some instances, a time stamp or other identifying indicia may be recorded on the paper web 26 for each of the nanomaterials samples 34 deposited on the paper web 26.

Once the samples 34 are collected on the paper web 26, the nanomaterials in the sample may then be analyzed in order to assess the properties of the nanomaterials being produced within the reactor. In general, this analysis is done spectroscopically using the aforementioned spectroscopic probe 28 disposed adjacent the paper web 26.

In general, analysis of the nanomaterials may be carried out by a variety of methods, including Raman, photoluminescence, Fourier transform infrared (FTIR) and mass spectroscopy as well as particle size analysis using a dynamic mobility analyzer or velocimetry. Typically, however, Raman spectroscopy is used for the analysis of the nanomaterial sample(s). Using one or more of these methods, various properties of the nanomaterials such as overall structure and quality (single wall vs multi-wall nanotube, average particle diameter, defect density etc.) may be determined.

Based on the spectroscopic analysis of the nanomaterials, at least one reaction parameter may be adjusted in order to further optimize the properties of the nanomaterials produced in the reactor vessel 12, according to the method of the present disclosure. For instance, the carrier gas may be adjusted from a first carrier gas feed rate to a second carrier gas feed rate. Alternatively, the reactant gas may be adjusted from a first reactant feed rate to a second reactant feed rate. Further, the reaction temperature within the reactor vessel 12 may be adjusted from a first temperature to a second temperature.

In certain embodiments, these adjustments are carried out while the reaction is still going. Thus, the spectroscopic analysis is used to provide inline or real-time feedback control of the reaction. In such embodiments, an electronic controller 36 is generally included with the reactor system 10. Data from the spectroscopic analysis is input into the controller 36, and using the data, the controller 36 may then adjust one or more of the aforementioned reaction parameters. For instance, the controller 36 may adjust the carrier gas control valve 22 to vary the carrier gas flow rate, or the controller 36 may adjust the reactant control valve 24 to vary the reactant flow rate, and/or the controller 36 may adjust the power supplied to the heat element in order to vary the reactor temperature.

In other embodiments of the present disclosure, the paper web 26 having a plurality of nanomaterial samples 34 deposited on it, may be retained as a sampling log. The nanomaterial samples 34 deposited thereon may be further analyzed after the completion of the reaction. Information regarding the nature and properties of the nanomaterials obtained in this manner may then be applied to further optimize the process control for future productions of nanomaterials within the reactor vessel 12.

Example

In this example, the effect of process conditions on the growth of single wall nanotubes (SWNTs)—including SWNT diameter, yield, and quality—was analyzed in real time.

For the example, SWNTs were grown using Floating Catalyst Chemical Vapor Deposition (FCCVD) using the following procedure—0.5 weight percent of ferrocene catalyst source) is dissolved into ethanol (which serves as a carbon source) and loaded into a disposable syringe (having a total volume in the syringe of about 5 milliliters) in a syringe pump (New Era Systems) as shown in the schematic in FIG. 1. The syringe pump delivers the catalyst and hydrocarbons at a controlled rate into the hot zone of the tube furnace reactor. In addition to the carbon and catalyst source, argon gas is flowed through the reactor at a flow rate of 700 sccm. Once the syringe is loaded into the syringe pump and the argon gas flow is turned on, the furnace temperature is set to 800° C. and heating is initialized. When the temperature of the furnace reaches 800° C., the syringe pump is turned on and injection initiated at a rate of 1 milliliter per minute. A high initial rate is necessary to load the dead volume in the injection tube that is inserted into the reactor (the total length of the injection tube is approximately 18" and it takes about 1 milliliter of precursor to load the injection tube). As soon as a plume of gas is observed at the exhaust end of the reactor, this signifies that the injection tube is now loaded and the syringe pump is set to a flow rate of 6 milliliters per hour for the rest of the experiment. At the exhaust end, the filter paper is engaged such that the products of the FCCVD reaction (SWNTs) are collected on a region of the filter, which is then analyzed inline using the fiber optic Raman probe. The syringe pump is paused during the collection of the Raman spectrum. The filter paper spool is then advanced and the syringe pump injection resumes prior to collection of the next SWNT deposit.

Figure 2:
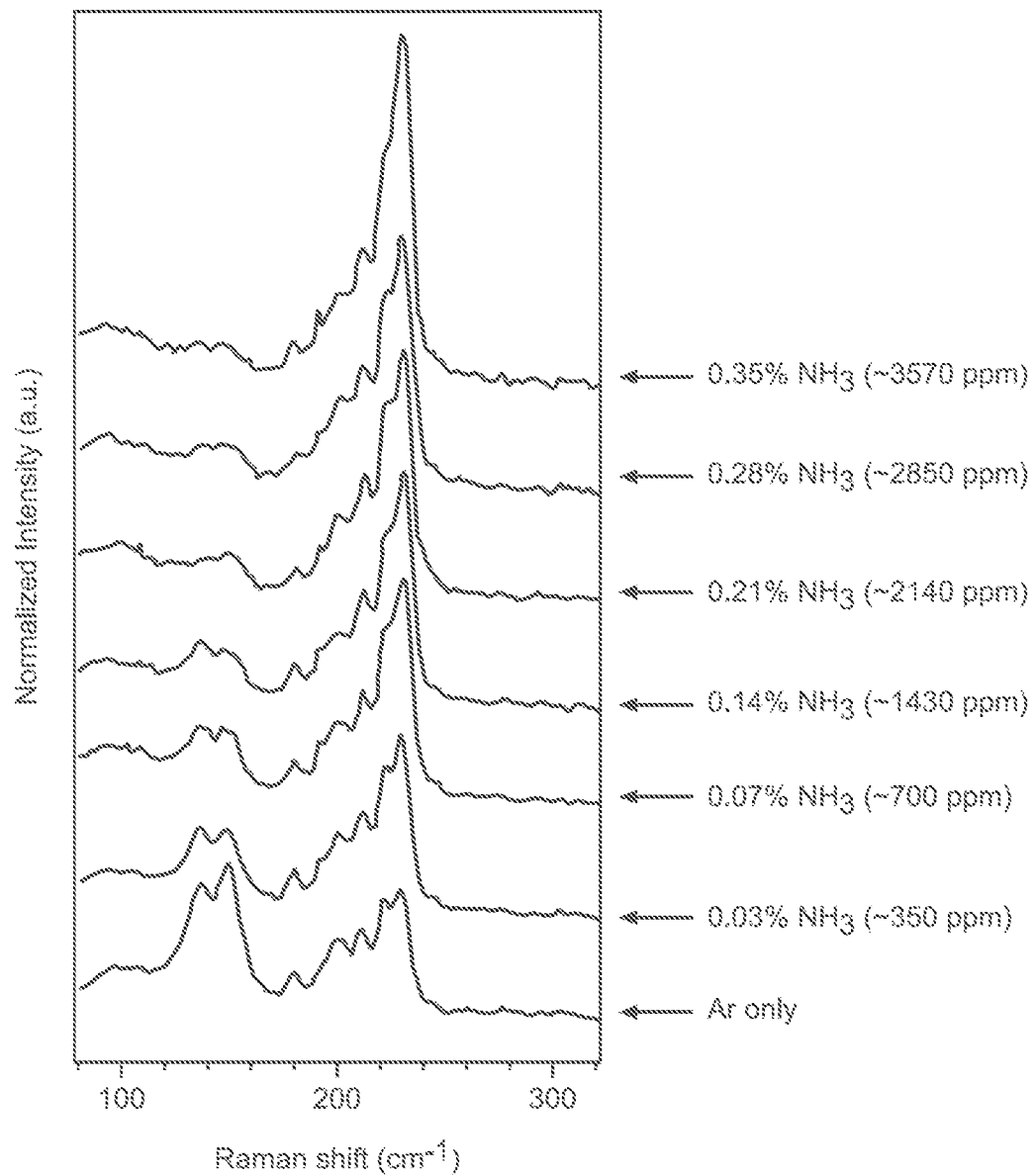
FIGS. 2-4 are a series of graphs depicting Raman spectroscopy data for nanomaterials prepared according to one embodiment of the present disclosure.

This system was used to test the effect of an ammonia ($NH_3$) additive on SWNT diameter, with the resulting being shown in FIG. 2 of the present disclosure. A small amount of $NH_3$ was added in varying amounts (from 0.03 to 0.35%) along with the argon carrier gas and Raman spectra were collected inline from the deposited SWNTs. FIG. 2 plots the various Raman spectra collected from the SWNTs as a function of increasing $NH_3$ from bottom to top. The spectra were collected with the 785 nm excitation from the fiber optic Raman probe. The bottom most spectrum corresponds to the peaks observed using the growth conditions described above, without any added ammonia.

When only using Ar as the carrier gas, two sets of low frequency modes can be observed centered around 130 and 220 cm−1. These peaks, called the radial breathing modes (RBMs), are unique to SWNTs and are inversely proportional to the tube diameters. With increasing $NH_3$ addition to the argon carrier gas from 350 to 3750 ppm, the lower frequency RBMs around 130 cm−1 progressively decrease in intensity. The lower frequency peaks correspond to larger tube diameters, suggesting that the addition of $NH_3$ lowers tube diameters. At the highest amount of $NH_3$, the 130 cm−1 peak almost completely vanishes. This effect was confirmed with other Raman excitation energies (i.e. different laser energies probe different tube structures and diameters).

Figure 3:
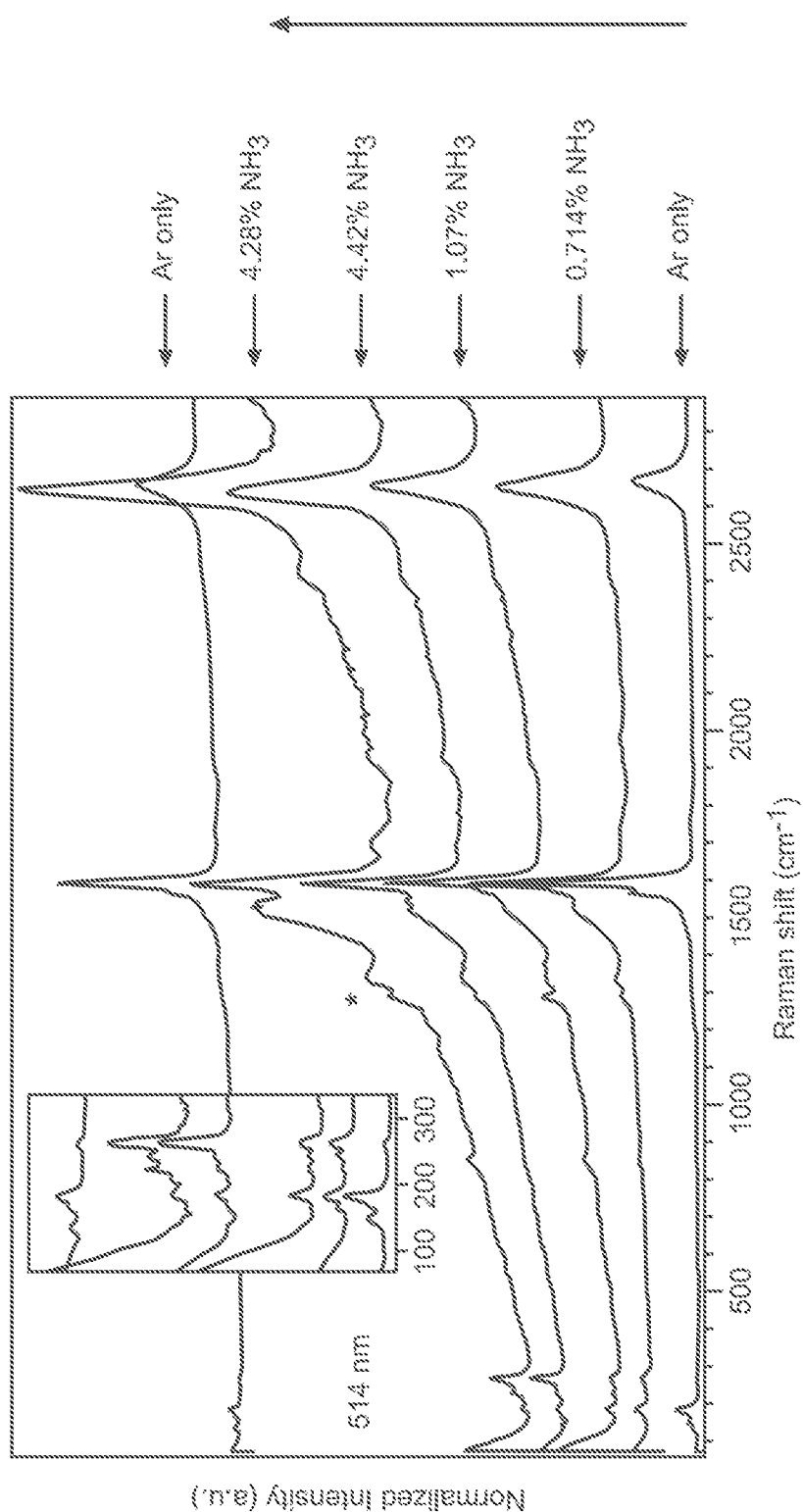
Figure 4:
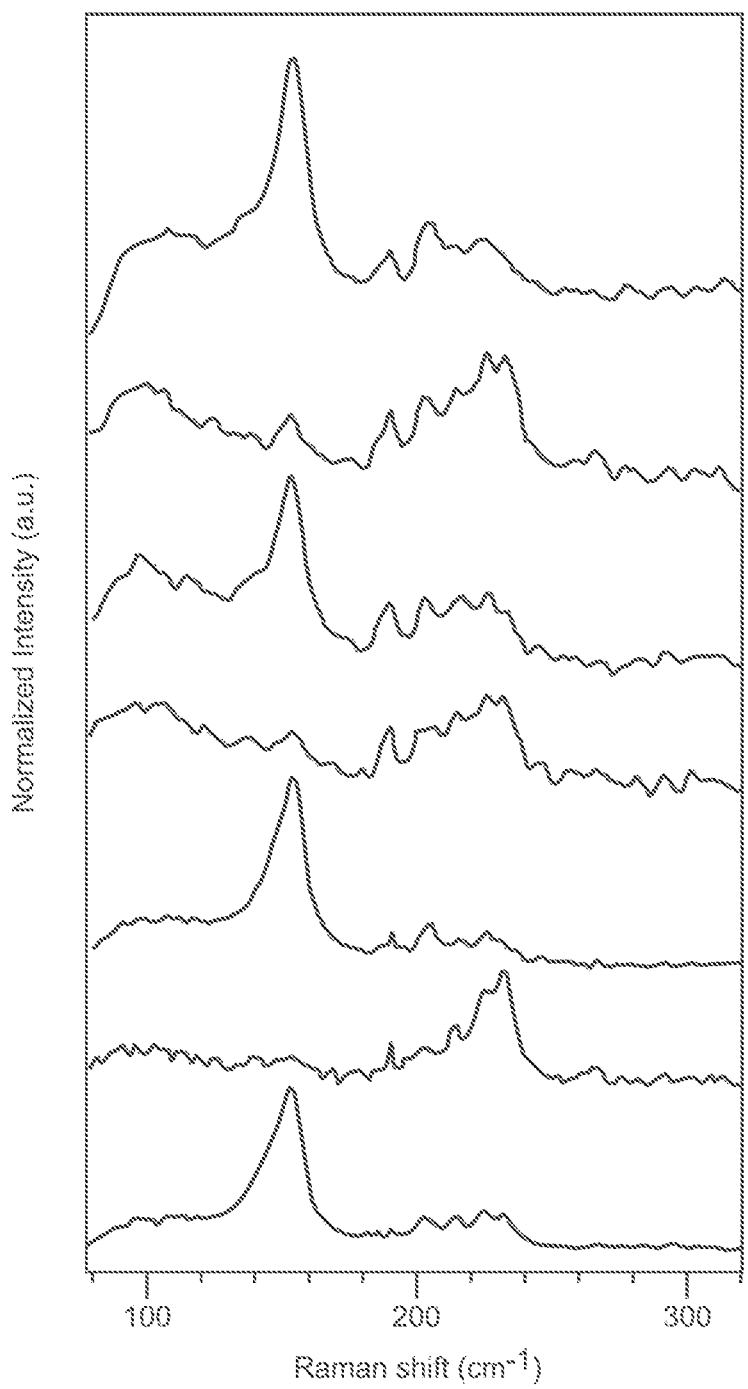

Thus, FIG. 3 of the present disclosure shows Raman spectra collected from the same SWNTs using a second laser excitation at 514 nanometers. In FIG. 3, the Raman spectra are shown with increasing amounts of $NH_3$ from bottom to top. With increasing $NH_3$, the lower frequency RBMs around 180 cm−1 (corresponding to larger diameter SWNTs) were observed to start to decrease in intensity and vanish, while the RBMs around 280 cm−1 increase in intensity.

In a further experiment, this change in SWNT tube diameter with the addition of ammonia was examined to see if it is reversible and can be monitored directly. Thus, growth experiments were conducted by alternating between adding both $NH_3$ and argon to the reactor, and adding argon only as the carrier source. The results are shown in FIG. From top to bottom, the first, third, fifth, and seventh Raman spectra show the RBMs measured inline with NH3 and argon being added, and the second, fourth, and sixth Raman spectra show RBMs measured inline with only argon being added and no NH3. From this, it may be seen that each time $NH_3$ is added to the reactor, a decrease in the lower frequency RBMs (larger diameter nanotubes) is observed, showing the reproducibility of the process.

As used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative compositions, and methods and illustrative examples shown and described. Accordingly, departures may be made from such details without departing from the scope or the spirit of the general inventive concept exemplified herein.

What is claimed is:

1. A method for making nanomaterials, the method comprising the steps of:
   providing a reactor vessel for reacting one or more gas phase reactants, the reactor vessel having an inlet port, an outlet port, a reaction catalyst disposed within the reactor vessel, and at least one heating element disposed adjacent to the reactor vessel;
   introducing into the reactor inlet port: (1) a carrier gas at a first carrier gas feed rate; (2) at least one carbon-based reactant at a first reactant feed rate;
   heating at least a first zone of the reactor vessel to a first temperature of at least 150° C., using the at least one heating element, so that a portion of the carbon-based reactant within the reactor vessel reacts to form a plurality of nanomaterials, wherein the nanomaterials are spectroscopically analyzed while the reaction within the reactor vessel continues; and
   adjusting, based on the spectroscopic analysis of the nanomaterials, at least one reaction parameter selected from the group consisting of the first carrier gas feed rate, the first reactant feed rate, and the first temperature.

2. The method of claim 1, further comprising:
   removing an exhaust gas comprising carrier gas, reactant, catalyst, and nanomaterials from the reactor.

3. The method of claim 2, further comprising:
   periodically sampling the exhaust gas by exposing a paper web to the exhaust gas so that a sample of the nanomaterials from the exhaust gas are deposited on a region of the paper web; and
   analyzing the nanomaterials deposited on the paper web.

4. The method of claim 1, wherein the step of introducing into the reactor inlet port further comprises: (3) at least one additive at a first additive feed rate.

5. The method of claim 1, wherein the reaction catalyst comprises a transition metal selected from the group consisting of iron, cobalt, nickel, molybdenum, ruthenium, rhodium, gallium, indium, copper, gold, silver, platinum, palladium, tungsten, and mixtures thereof.

6. The method of claim 1, wherein the nanomaterials comprise carbon nanotubes and the reaction catalyst comprises at least one organometallic compound comprising a transition metal.

7. The method of claim 1, wherein the at least one carbon-based reactant comprises at least one gas selected from the group consisting of ethanol, methanol, isopropanol and butanol, xylene, toluene, benzene, hexane, cyclohexane, methane, ethylene, acetylene, ethane, propane, and propylene.

8. The method of claim 1, wherein the carrier gas comprises at least one gas selected from the group consisting of nitrogen, helium, neon, and argon.

9. The method of claim 1, wherein the at least one additive introduced into the reactor is selected from the group consisting of water, ammonia, carbon dioxide, carbon monoxide, thiophene, dimethyl sulfoxide, carbon tetrafluoride, sulfur hexafluoride, acetonitrile, and carborane.

10. The method of claim 1, wherein the first temperature is from about 350° C. to about 1200° C.

11. The method of claim 1, wherein the paper web comprises an elongate strip of paper and wherein a plurality of nanomaterials samples from the exhaust gas are deposited on different regions of the paper web.

12. The method of claim 11, wherein a time stamp is recorded on the paper web for each of the nanomaterials samples deposited on the paper web.

13. The method of claim 1, wherein at least 80 weight percent of the nanomaterials formed in the reactor vessel are single wall carbon nanotubes.

14. The method of claim 1, wherein the nanomaterials are analyzed using Raman spectroscopy.

* * * * *